(12) United States Patent
Walker et al.

(10) Patent No.: US 12,305,404 B2
(45) Date of Patent: May 20, 2025

(54) BRACKET FOR STAIR RAILINGS

(71) Applicant: Peak Innovations Inc., Richmond (CA)

(72) Inventors: Simon Walker, Delta (CA); Craig Lawson, Burnaby (CA); Charles Young, Vancouver (CA); Adam Mantei, Burnaby (CA)

(73) Assignee: PEAK INNOVATIONS INC., Richmond (CA)

( * ) Notice: Subject to any disclaimer, the term of this patent is extended or adjusted under 35 U.S.C. 154(b) by 427 days.

(21) Appl. No.: 17/632,378

(22) PCT Filed: Aug. 24, 2020

(86) PCT No.: PCT/CA2020/051155
§ 371 (c)(1),
(2) Date: Feb. 2, 2022

(87) PCT Pub. No.: WO2021/030917
PCT Pub. Date: Feb. 25, 2021

(65) Prior Publication Data
US 2022/0290437 A1  Sep. 15, 2022

Related U.S. Application Data

(60) Provisional application No. 62/890,327, filed on Aug. 22, 2019.

(51) Int. Cl.
*E04H 17/14* (2006.01)
*E04B 1/38* (2006.01)
*E04F 11/18* (2006.01)

(52) U.S. Cl.
CPC .............. *E04F 11/18* (2013.01); *E04B 1/388* (2023.08); *E04F 11/1834* (2013.01); *E04H 17/1448* (2021.01); *E04H 17/1488* (2021.01); *E04B 2001/389* (2023.08); *E04F 2011/1868* (2013.01)

(58) Field of Classification Search
CPC ............ E04H 17/1447; E04H 17/1448; E04H 17/1452; E04H 17/1488; E04F 11/1834; E04F 2011/1819; E04F 2011/1821
See application file for complete search history.

(56) References Cited

U.S. PATENT DOCUMENTS 6,053,481 A    4/2000 Scheide
6,805,335 B2 * 10/2004 Williams .............. E04F 11/181
                                                    256/65.06

(Continued)

*Primary Examiner* — Michael P Ferguson
(74) *Attorney, Agent, or Firm* — OYEN, WIGGS, GREEN & MUTALA LLP

(57) ABSTRACT

A bracket for connecting a stair rail to a post comprises a base and a cover adapted to slide over the base. The base comprises a plate and two opposed sidewalls. The plate has first and second surfaces. The sidewalls extend from the first surface of the plate. Two plate protrusions are formed on the second surface of the plate, with the two plate protrusions extending for at least a portion of a height of the plate. The cover comprises a roof, two opposed cover walls extending from the roof, and two flanges. Each of the cover walls comprise a cover wall edge, with each of the flanges extend from the cover wall edge for at least a portion of a height of the cover wall. The flanges are adapted to engage with the plate protrusions when the cover is slid over the base.

18 Claims, 16 Drawing Sheets

(56) References Cited

U.S. PATENT DOCUMENTS

| | | | |
|---|---|---|---|
| 6,893,008 B2* | 5/2005 | Forbis | E04H 17/1488 256/65.05 |
| 7,731,160 B2* | 6/2010 | Terrels | E04F 11/1836 256/65.06 |
| 8,167,275 B1* | 5/2012 | Bizzarri | E04H 17/1488 256/65.02 |
| 9,322,180 B2* | 4/2016 | Burt | E04F 11/1834 |
| 2003/0127575 A1 | 7/2003 | Forbis | |
| 2003/0164486 A1* | 9/2003 | West | E04H 17/1488 256/65.1 |
| 2004/0026680 A1 | 2/2004 | Williams | |
| 2006/0022187 A1* | 2/2006 | Forbis | E04F 11/1817 256/59 |
| 2006/0175594 A1* | 8/2006 | Burkart | E04H 17/1488 256/65.02 |
| 2007/0131920 A1 | 6/2007 | Platt | |
| 2009/0114895 A1 | 5/2009 | Terrels et al. | |
| 2013/0175488 A1 | 7/2013 | Burt et al. | |
| 2019/0119924 A1 | 4/2019 | Timmons | |

* cited by examiner

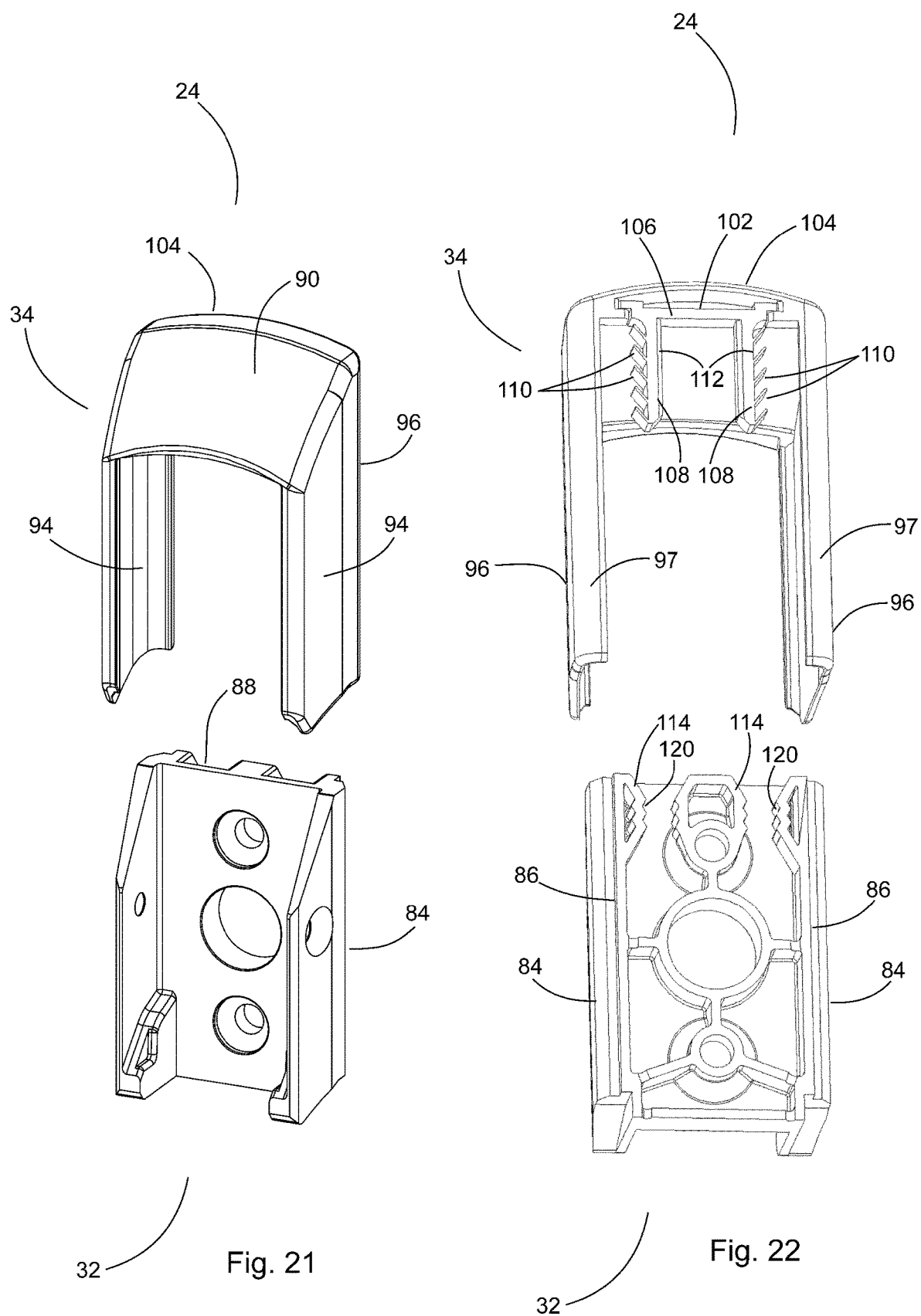

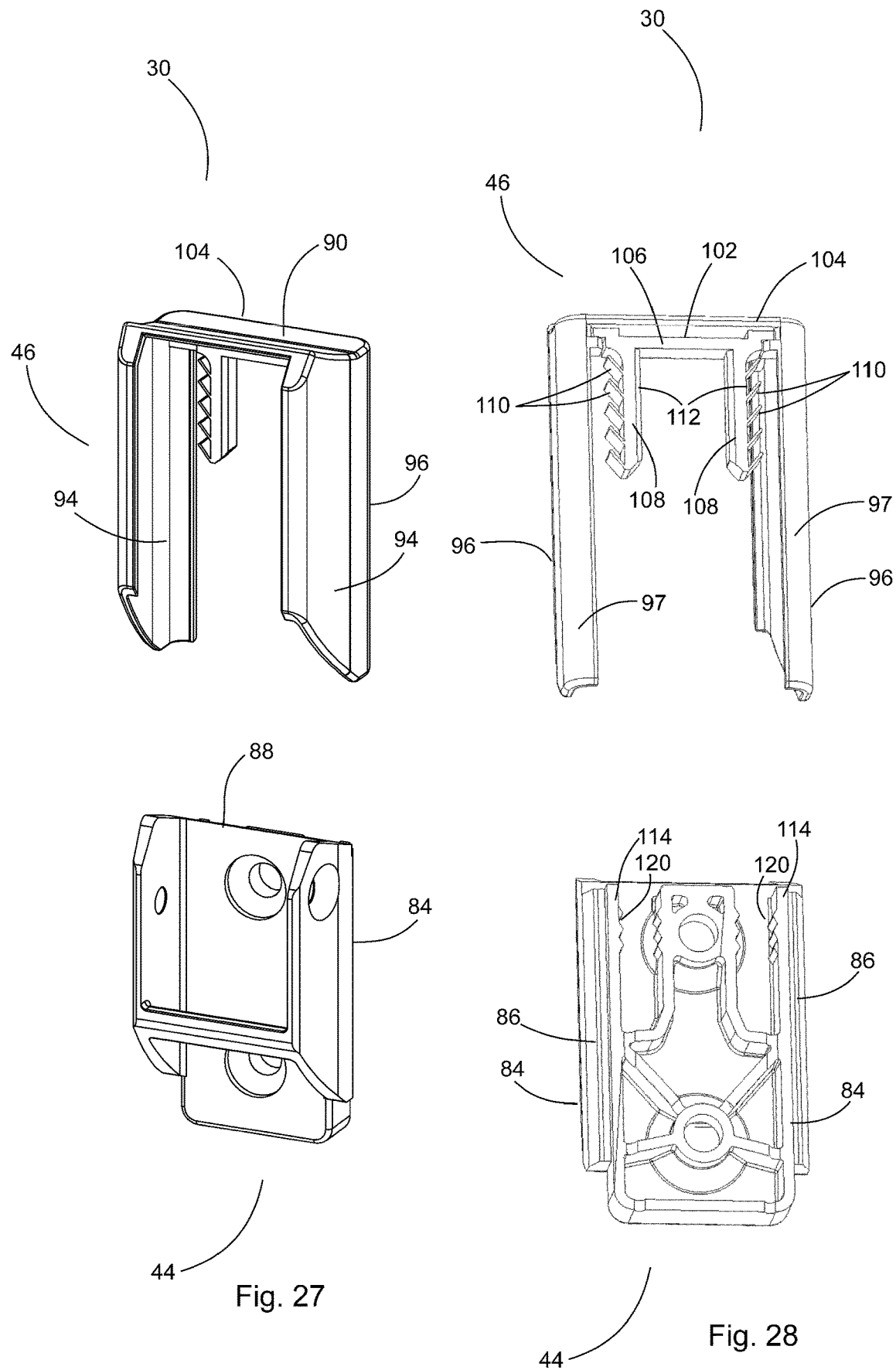

BRACKET FOR STAIR RAILINGS

FIELD OF THE INVENTION

The present invention relates to railing systems, and in particular, to railing systems for use with stairs.

BACKGROUND OF THE INVENTION

Railing systems for any number of outdoor applications are well known. For example, residential decks, pool decks, and playgrounds all utilize any number of conventional railing systems. Such railing systems typically comprise posts, with top and bottom longitudinal rails extending between the posts and a number of vertical pickets spanning between the rails.

However, when the railing system involves stairs, the top and bottom rails are now oriented at an angle with respect to the posts, as it is important that the rails are securely attached to the posts. Because the angle at which the rails engage with the posts differ from one set of stairs to another (depending on the steepness of the stairs), there will often be a gap formed between the edge of the rail and the side of the post. Such a gap is unsightly and also allows for the elements (e.g. rain, dirt, etc.) to enter into the space between the rail and the post.

Therefore, it is desirable for a railing system for use with stairs that will address the problems described above.

SUMMARY OF THE INVENTION

A bracket for connecting a stair rail to a post comprises a base and a cover adapted to slide over the base. The base comprises a plate and two opposed sidewalls. The plate has first and second surfaces, with the plate comprising at least one plate opening extending therethrough and adapted to receive post fasteners for securing the plate to the post. The sidewalls extend from the first surface of the plate and are adapted to receive stair rail, with each of the sidewalls comprising at least one sidewall opening adapted to receive sidewall fasteners for securing the sidewall to the stair rail. Two plate protrusions are formed on the second surface of the plate, with the two plate protrusions extending for at least a portion of a height of the plate. The cover comprises a roof, two opposed cover walls extending from the roof, and two flanges. The cover walls are adapted to slide over the sidewalls. Each of the cover walls comprise a cover wall edge, with each of the flanges extend from the cover wall edge for at least a portion of a height of the cover wall. The flanges are adapted to engage with the plate protrusions when the cover is slid over the base.

In another embodiment, the cover further comprises an attachment portion. The base further comprises one or more receiving members adapted to engage with the attachment portion to secure the cover to the base.

In yet another embodiment, the attachment portion comprises a body portion attached to the roof, one or more arms extending from the body portion, with each of arms comprises two lateral arm surfaces, and for each of the arms, a plurality of projections extending from one or both of the lateral arm surfaces. The receiving members are adapted to engage with the projections.

In still yet another embodiment, the projections are angled.

In a further embodiment, the projections are deflectable.

In still a further embodiment, the receiving members comprise a plurality of teeth, with the teeth adapted to engage with the projections.

In still yet a further embodiment, the plate comprises one or more accessory openings extending therethrough, with the accessory openings adapted to allow an accessory to pass through the plate.

In another embodiment, at least one of the attachment portions are attached to the plate protrusions.

In still another embodiment, at least one of the attachment portions are integral with the plate protrusions.

In still yet another embodiment, the roof is contoured to cover a gap between the stair rail and the post.

In another embodiment, a railing system for stairs comprises an upper rail comprising upper rail first and second ends, a lower rail comprising lower rail first and second ends, first and second posts, with the first post is elevated with respect to the second post, a first bracket for connecting the upper rail first end to the first post, a second bracket for connecting the lower rail first end to the first post, a third bracket for connecting the upper rail second end to the second post, and a fourth bracket for connecting the lower rail second end to the second post. Each of the first, second, third, and fourth brackets comprise a base and a cover adapted to slide over the base. The base comprises a plate and two opposed sidewalls. The plate has first and second surfaces, with the plate comprising at least one plate opening extending therethrough and adapted to receive post fasteners for securing the plate to the post. The sidewalls extend from the first surface of the plate and are adapted to receive one of the upper rail or the lower rail, with each of the sidewalls comprising at least one sidewall opening adapted to receive sidewall fasteners for securing the sidewall to the stair rail. Two plate protrusions are formed on the second surface of the plate, with the two plate protrusions extending for at least a portion of a height of the plate. The cover comprises a roof, two opposed cover walls extending from the roof, and two flanges. The cover walls are adapted to slide over the sidewalls. Each of the cover walls comprise a cover wall edge, with each of the flanges extend from the cover wall edge for at least a portion of a height of the cover wall. The flanges are adapted to engage with the plate protrusions when the cover is slid over the base.

In yet another embodiment, for the first and third brackets, the base comprises ledges extending inwardly from the sidewalls, with the ledges adapted to support the upper rail.

In still yet another embodiment, the ledges are angled with respect to the horizontal.

In a further embodiment, the ledges for the first bracket are angled in a direction opposite to the ledges for the third bracket.

In still a further embodiment, for the second bracket, the base comprises a floor adapted to support the lower rail.

In still yet a further embodiment, for the fourth bracket, the base comprises a bar adapted to support the lower rail In yet another embodiment, the roof is contoured to cover a gap between the stair rail and the post.

In still yet another embodiment, the roof is contoured to prevent water from entering the gap.

The foregoing was intended as a summary only and of only some of the aspects of the invention. It was not intended to define the limits or requirements of the invention. Other aspects of the invention will be appreciated by reference to the detailed description of the preferred embodiments.

BRIEF DESCRIPTION OF THE DRAWINGS

The embodiments of the invention will be described by reference to the drawings thereof, in which:

FIG. 21 is a front exploded view of the first bracket of FIG. 16;

FIG. 22 is rear exploded view of the first bracket of FIG. 16;

FIG. 27 is a front exploded view of the fourth bracket of FIG. 19; and

FIG. 28 is a rear exploded view of the fourth bracket of FIG. 19.

DETAILED DESCRIPTION OF THE INVENTION

Figure 1:
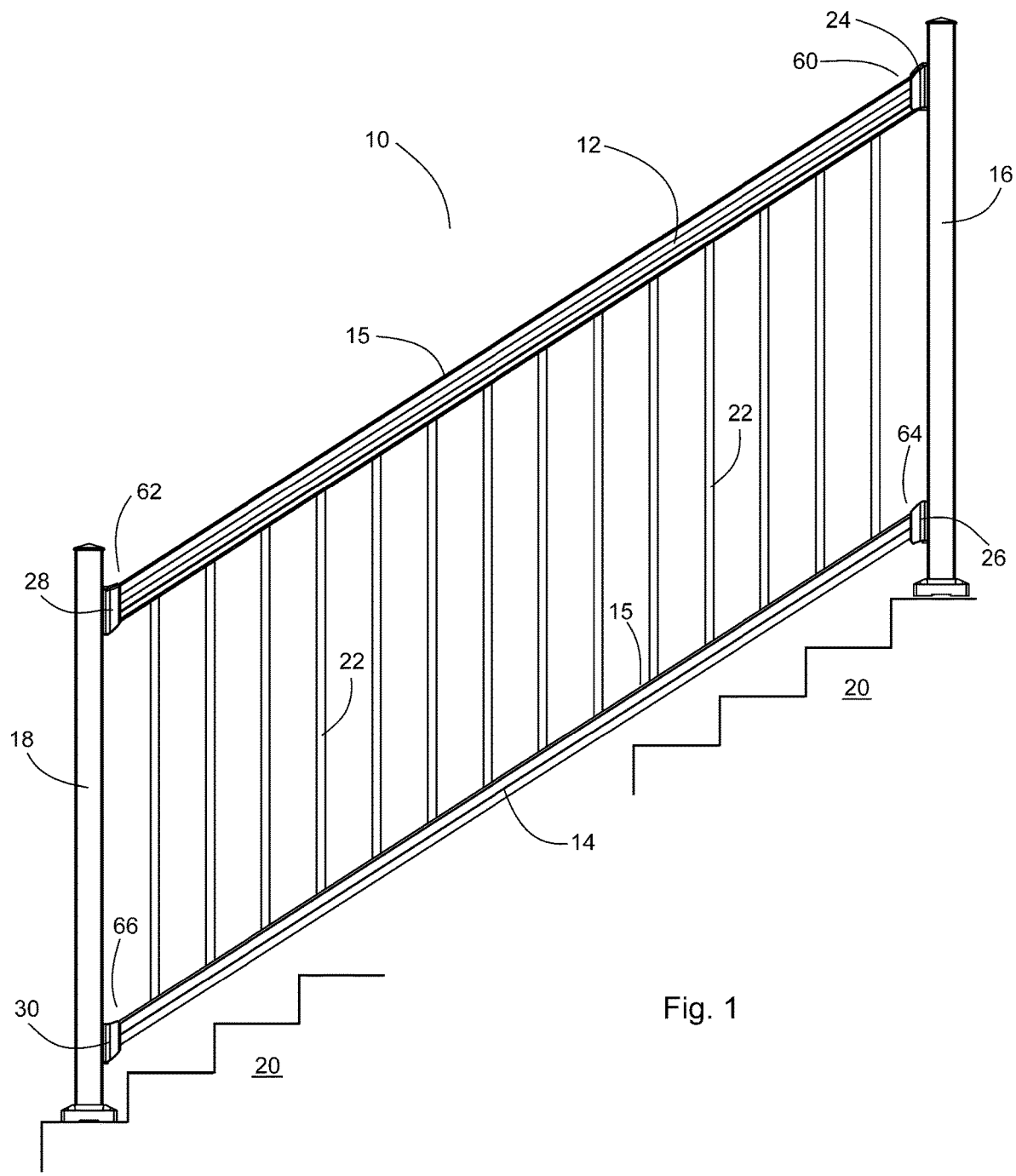
FIG. 1 shows a railing system in accordance with one embodiment of the invention.

Referring to FIG. 1, a railing system 10 in accordance with the present invention is generally shown. The railing system 10 preferably comprises an elongated upper rail 12 and an elongated lower rail 14 extending between first and second posts 16, 18. Both of the upper and lower rails 12, 14 preferably comprises a rail upper surface 15. As the railing system 10 is intended to be used with stairs 20, in the embodiment shown in FIG. 1, the first post 16 is situated higher relative to the second post 18. As a result, the upper and lower rails 12, 14 are typically not perpendicular to the first and second posts 16, 18. In addition, the railing system 10 preferably also comprises a plurality of pickets 22 spanning between the upper and lower rails 12, 14.

Figure 2:
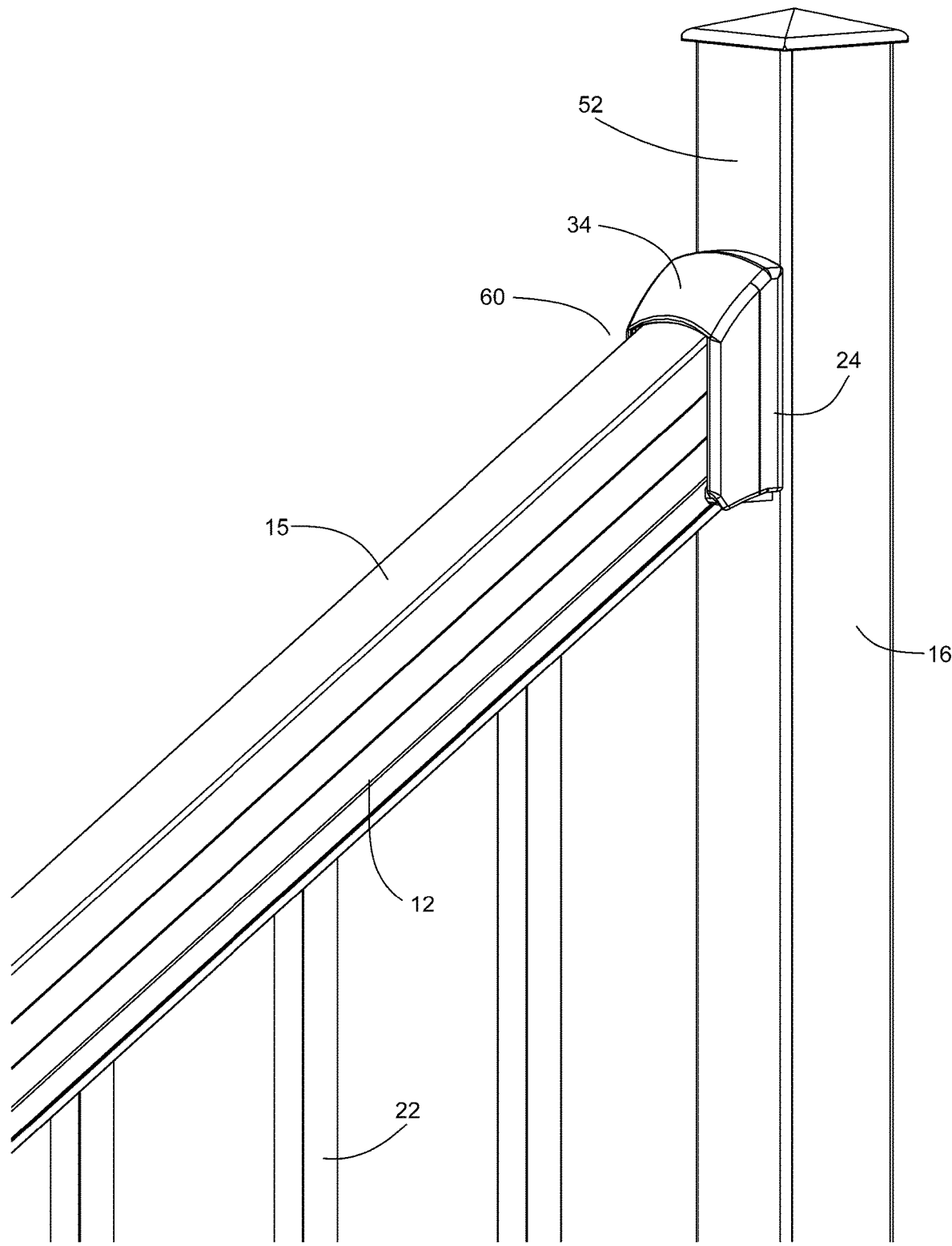
FIG. 2 is a partial view of the railing system of FIG. 1 showing the first bracket.
Figure 7:
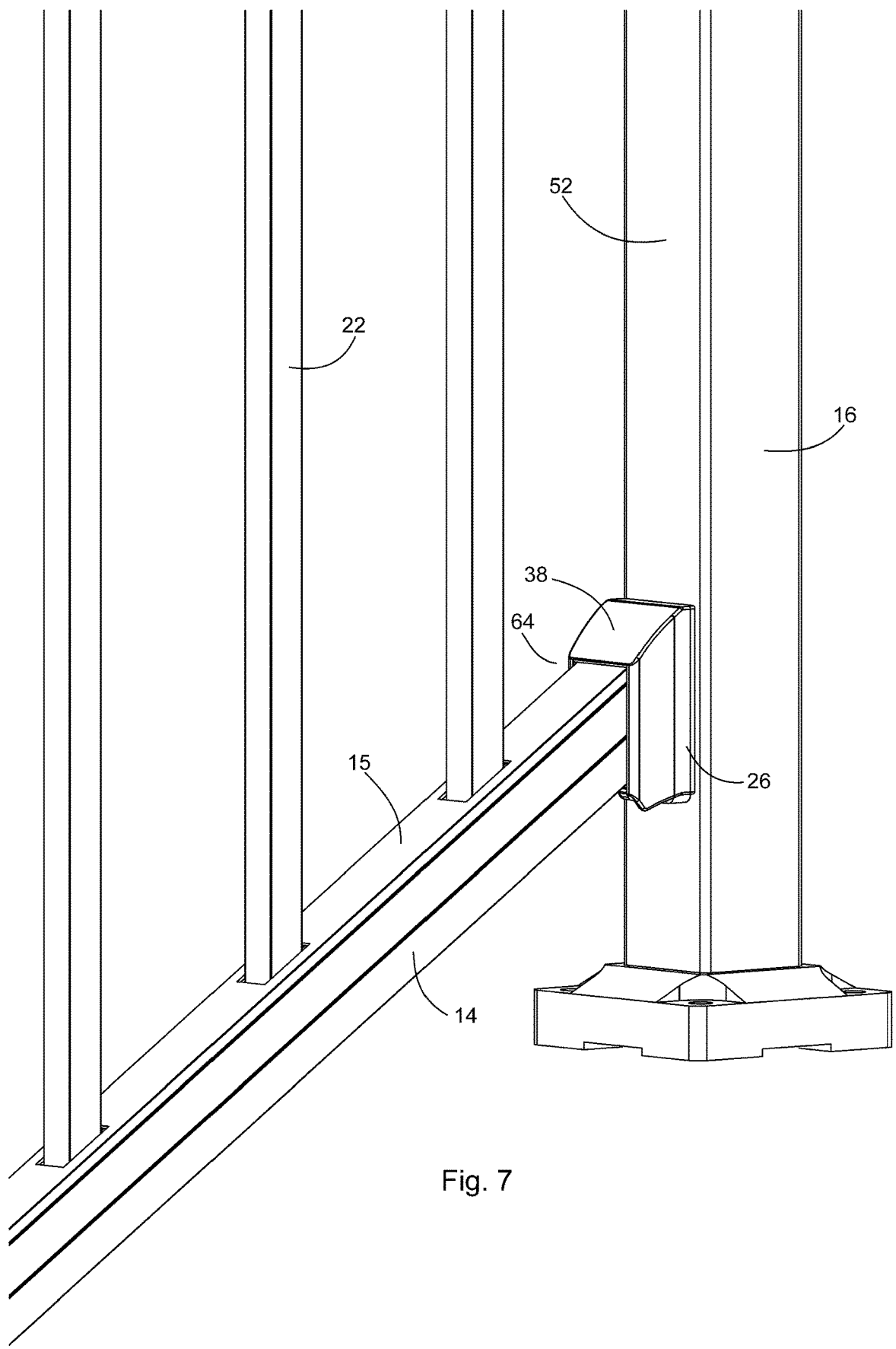
FIG. 7 is a partial view of the railing system of FIG. 1 showing the second bracket.
Figure 10:
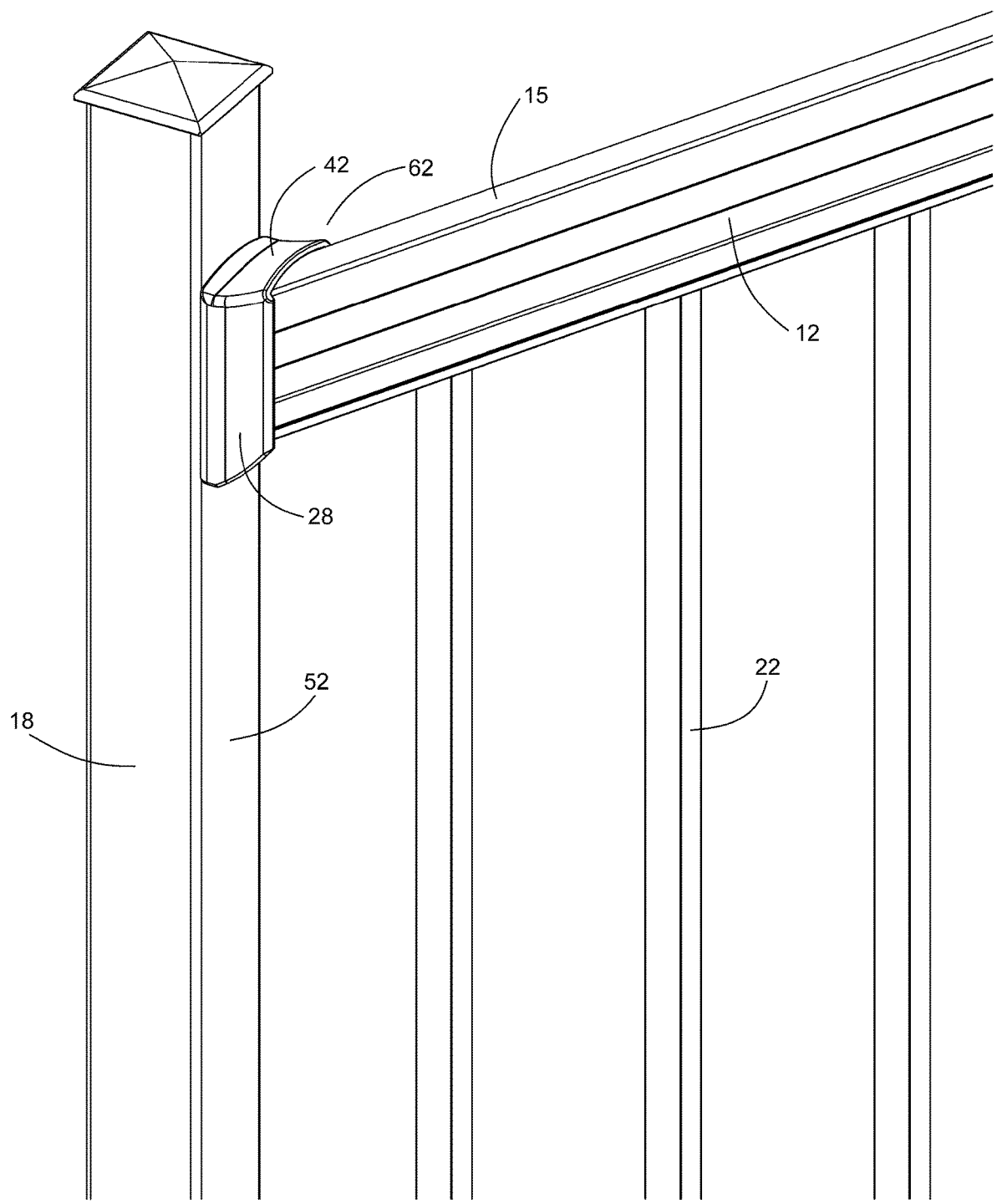
FIG. 10 is a partial view of the railing system of FIG. 1 showing the third bracket.
Figure 13:
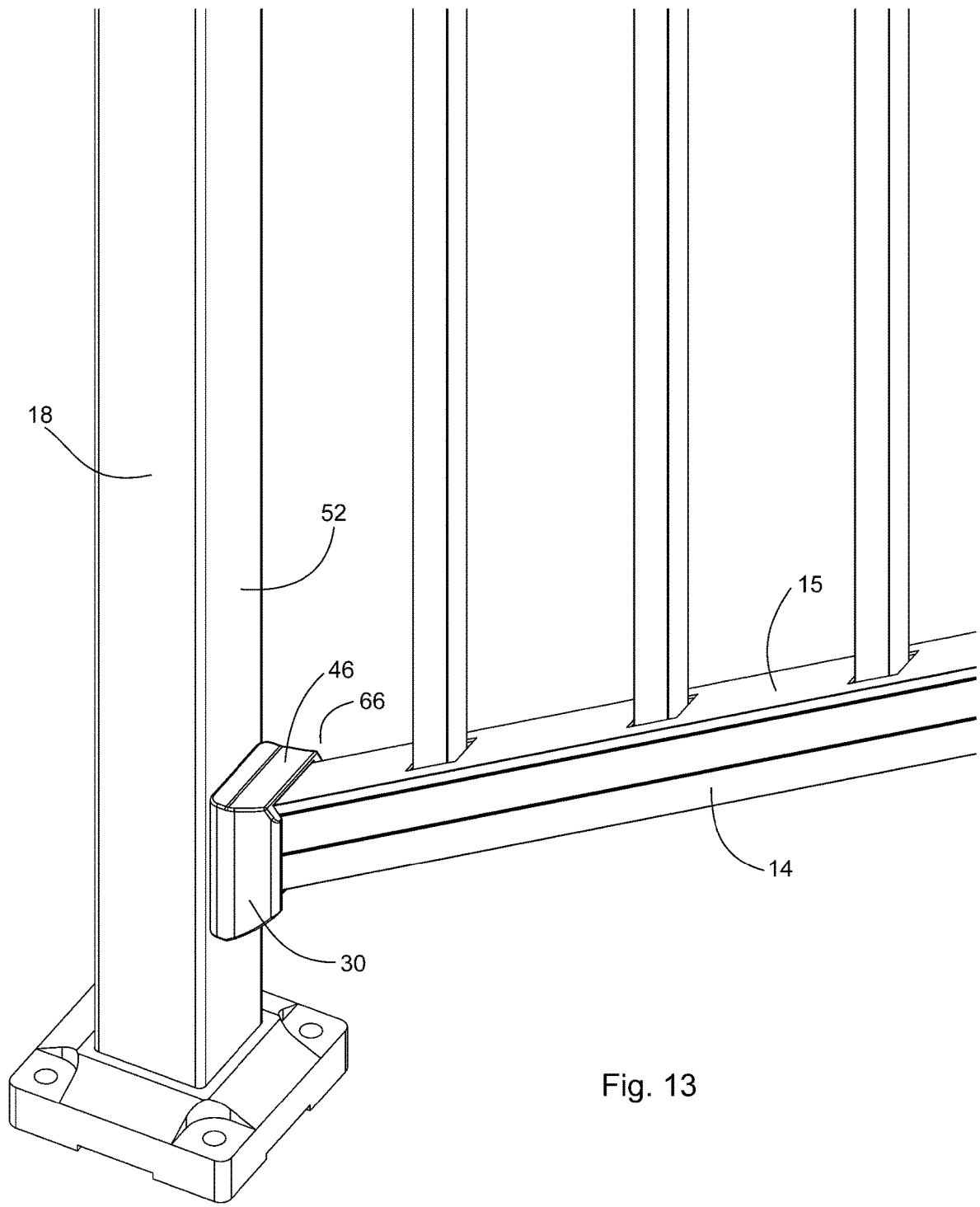
FIG. 13 is a partial view of the railing system of FIG. 1 showing the fourth bracket.

Referring to FIG. 1, the upper and lower rails 12, 14 are connected to post surfaces 52 on the first and second posts 16, 18 using first, second, third, and fourth brackets 24, 26, 28, 30. In particular, the upper rail 12 is connected to the first post 16 through a first bracket 24 (as best shown in FIG. 2). The lower rail 14 is connected to the first post 16 through a second bracket 26 (as best shown in FIG. 7). The upper rail 12 is connected to the second post 18 through a third bracket 28 (as best shown in FIG. 10). The lower rail 14 is connected to the second post 18 through a fourth bracket 30 (as best shown in FIG. 13).

Figures 8, 9:
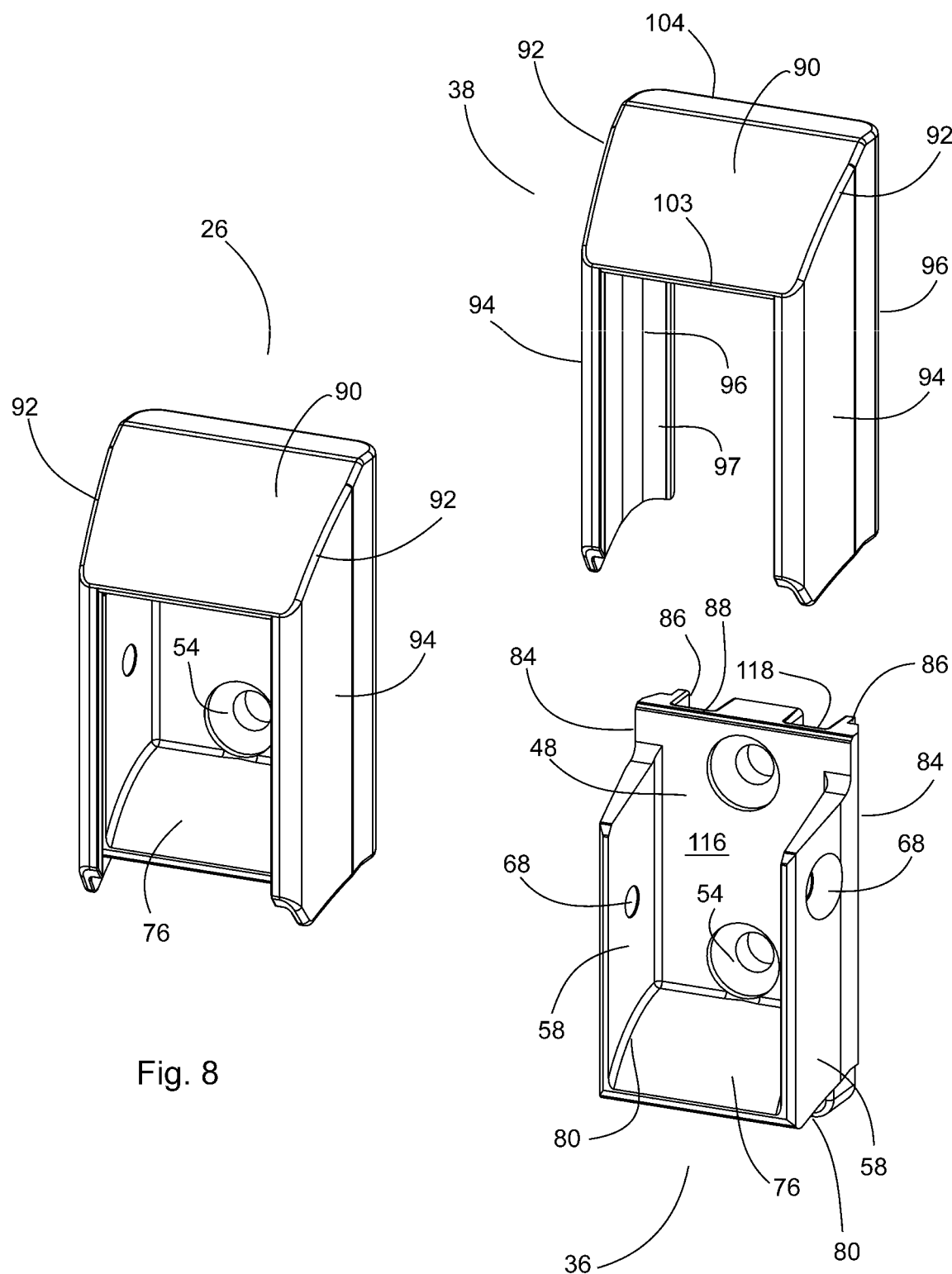
FIG. 8 shows the second bracket of FIG. 7.
FIG. 9 is an exploded view of the second bracket of FIG. 8.
Figure 11:
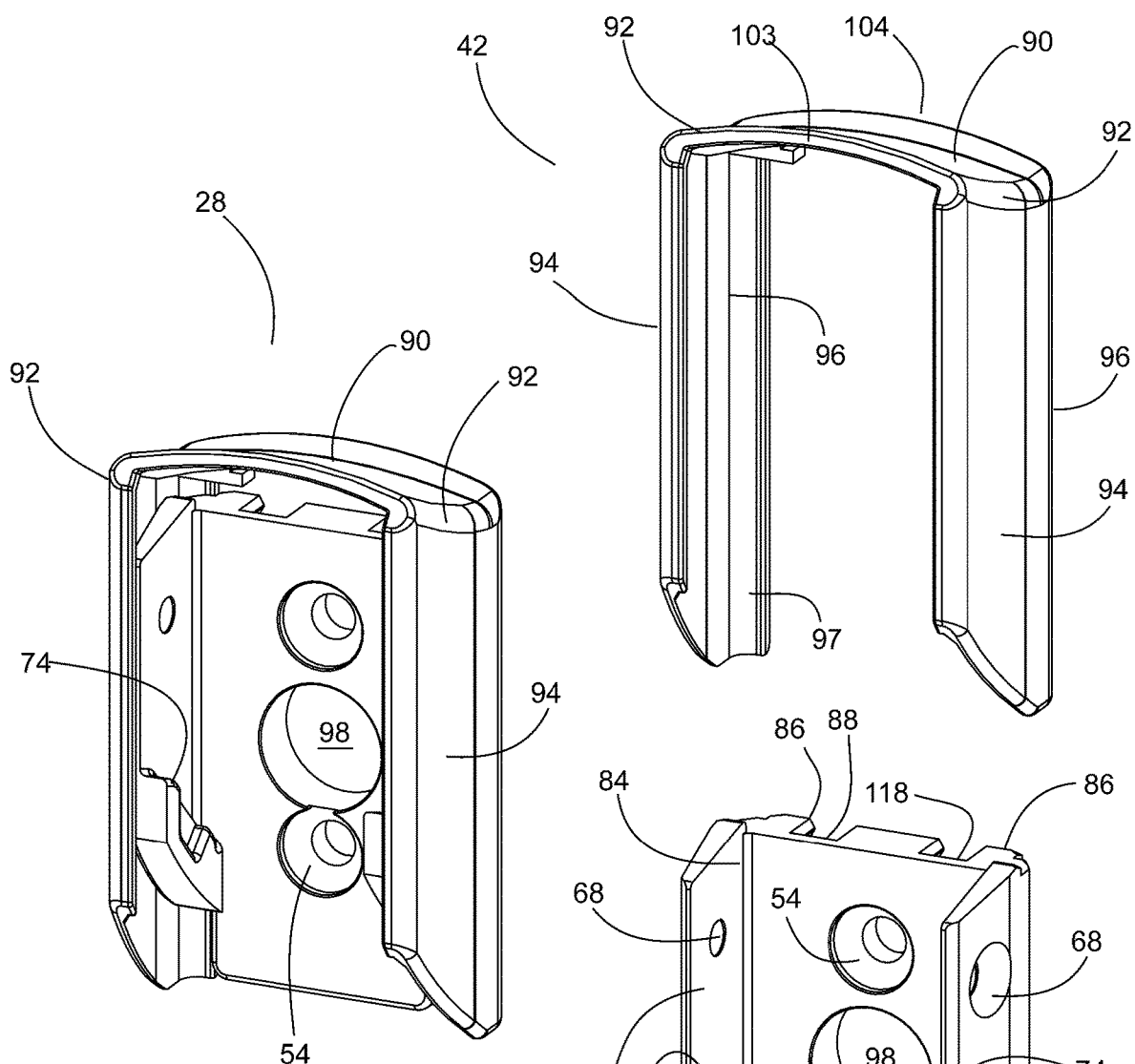
FIG. 11 shows the third bracket of FIG. 10.
Figure 12:
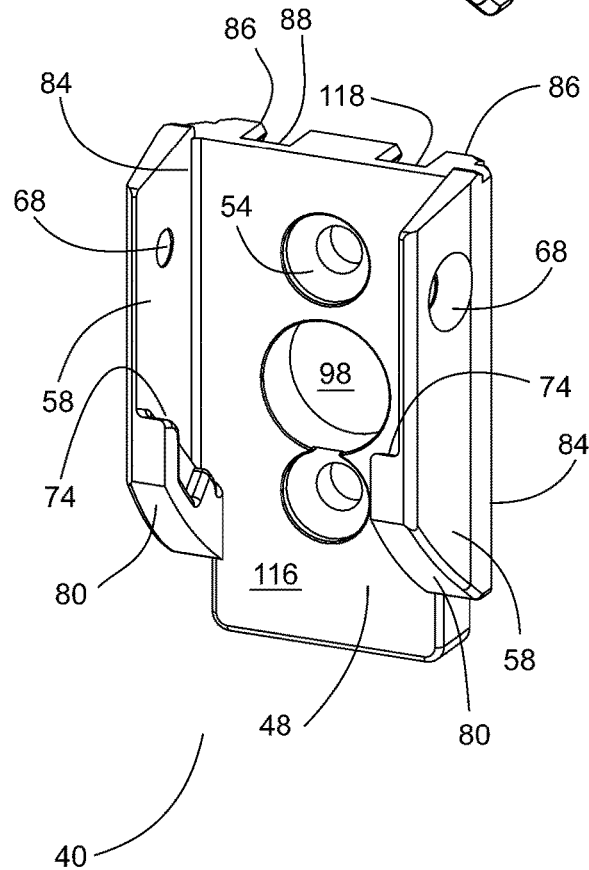
FIG. 12 is an exploded view of the third bracket of FIG. 11.
Figure 14:
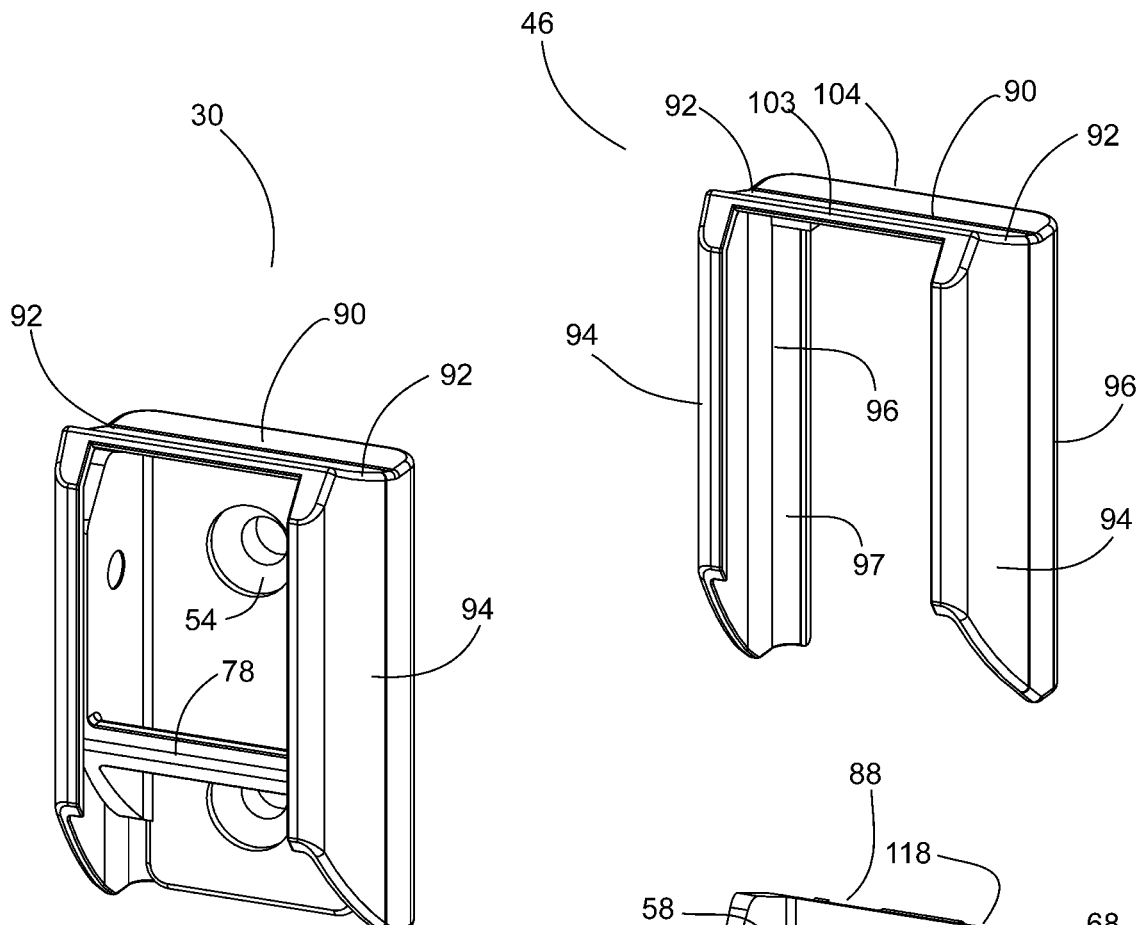
FIG. 14 shows the fourth bracket of FIG. 13.
Figure 15:
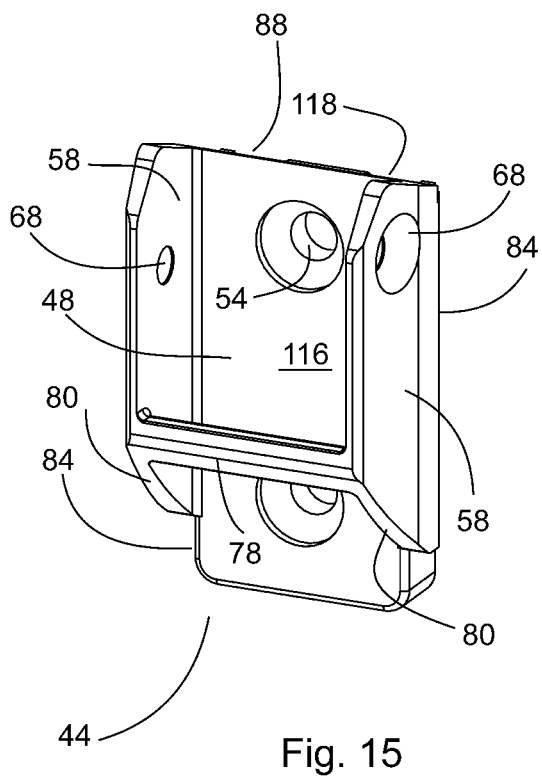
FIG. 15 is an exploded view of the fourth bracket of FIG. 14.
Figure 16:
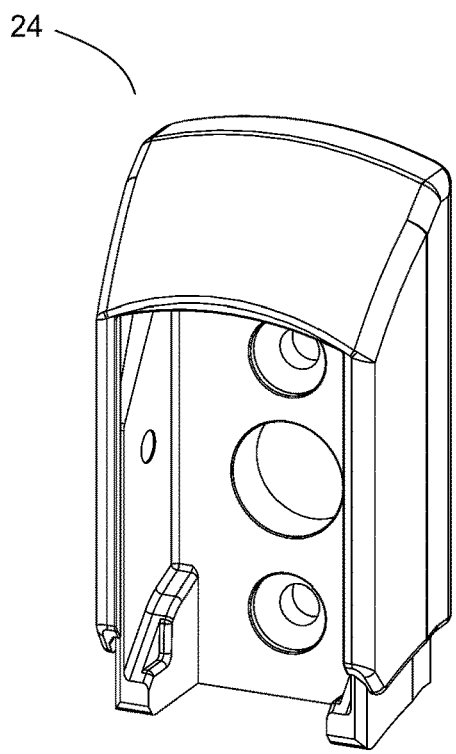
FIG. 16 shows another embodiment of the first bracket.
Figure 17:
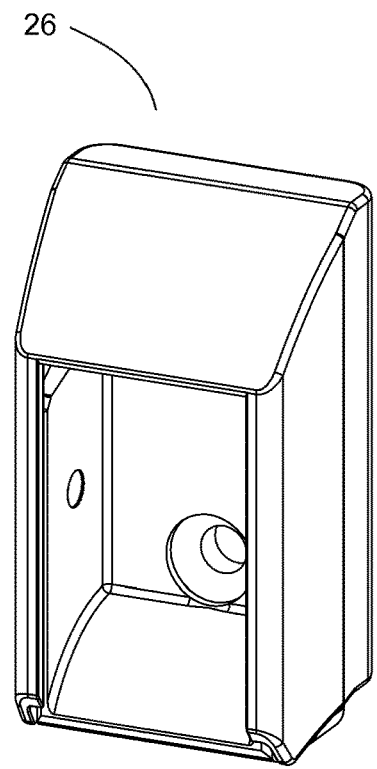
FIG. 17 shows another embodiment of the second bracket.
Figure 18:
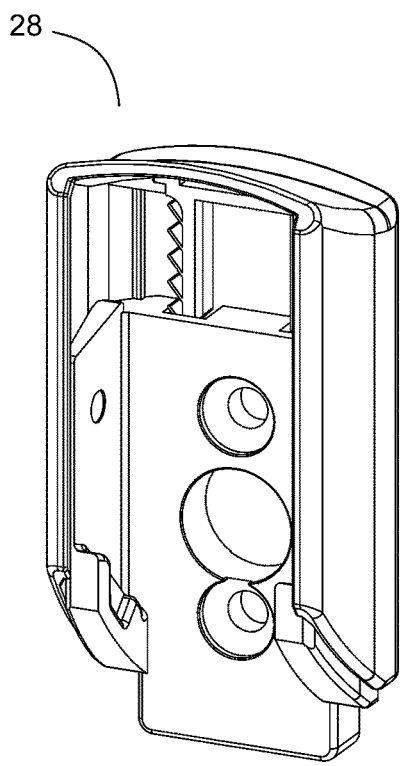
FIG. 18 shows another embodiment of the third bracket.
Figure 19:
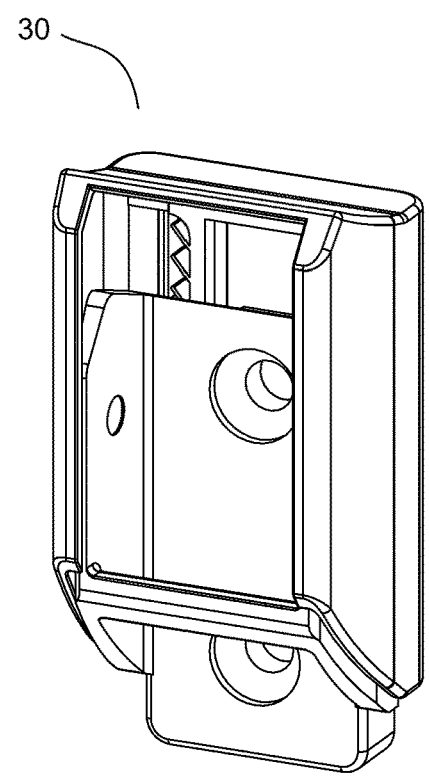
FIG. 19 shows another embodiment of the fourth bracket.

Referring to FIGS. 2 to 15, each of the first, second, third, and fourth brackets 24, 26, 28, 30 comprises two portions. For example, the first bracket 24 comprises a first base 32 and a first cover 34 (as best shown in FIGS. 5 and 6). The second bracket 26 comprises a second base 36 and a second cover 38 (as best shown in FIGS. 8 and 9). The third bracket 28 comprises a third base 40 and a third cover 42 (as best shown in FIGS. 11 and 12). Finally, the fourth bracket 30 comprises a fourth base 44 and a fourth cover 46 (as best shown in FIGS. 14 and 15).

Figure 3:
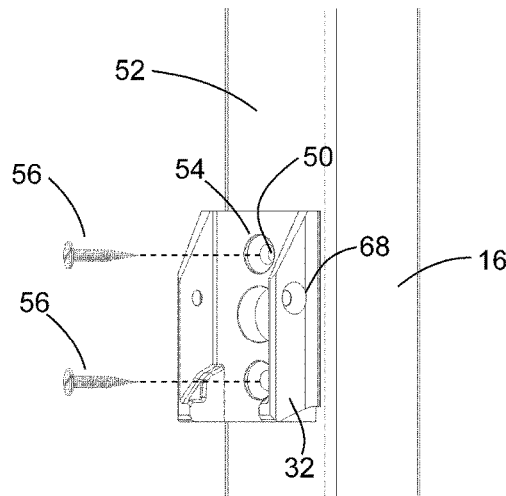
FIG. 3 is a partial view of FIG. 2 showing the first base and the first post.

The first, second, third, and fourth bases 32, 36, 40, 44 generally comprise a plate 48 that is adapted to engage with one of the first and second posts 16, 18. The plate 48 comprises first and second plate surfaces 116, 118. The first and second posts 16, 18 preferably comprise a plurality of post openings 50 located on the post surfaces 52 of the first and second posts 16, 18. The plate 48 comprises one or more plate openings 54 that correspond in location to the post openings 50. Both the post openings 50 and the plate openings 54 are adapted to receive post fasteners 56 that act to secure the plate 48 to one of the first and second posts 16, 18 (as best shown in FIG. 3). The post fasteners 56 may be screws, bolts, or any other suitable fasteners. Although FIG. 3 only depicts the first base 32 secured to the first post 16, it is understood that the second, third, and fourth bases 36, 40, 44 are secured in a similar manner to the first post 16 and/or second post 18.

The bases 32, 36, 40, 44 further comprise a pair of opposed sidewalls 58 extending generally perpendicularly from the first plate surface 116. The sidewalls 58 comprise a lower sidewall edge 80. The sidewalls 58 are adapted to receive one of the upper rail 12 or the lower rail 14. The upper rail 12 comprises upper rail first and second ends 60, 62. Similarly, the lower rail 14 comprises lower rail first and second ends 64, 66.

Figure 4:
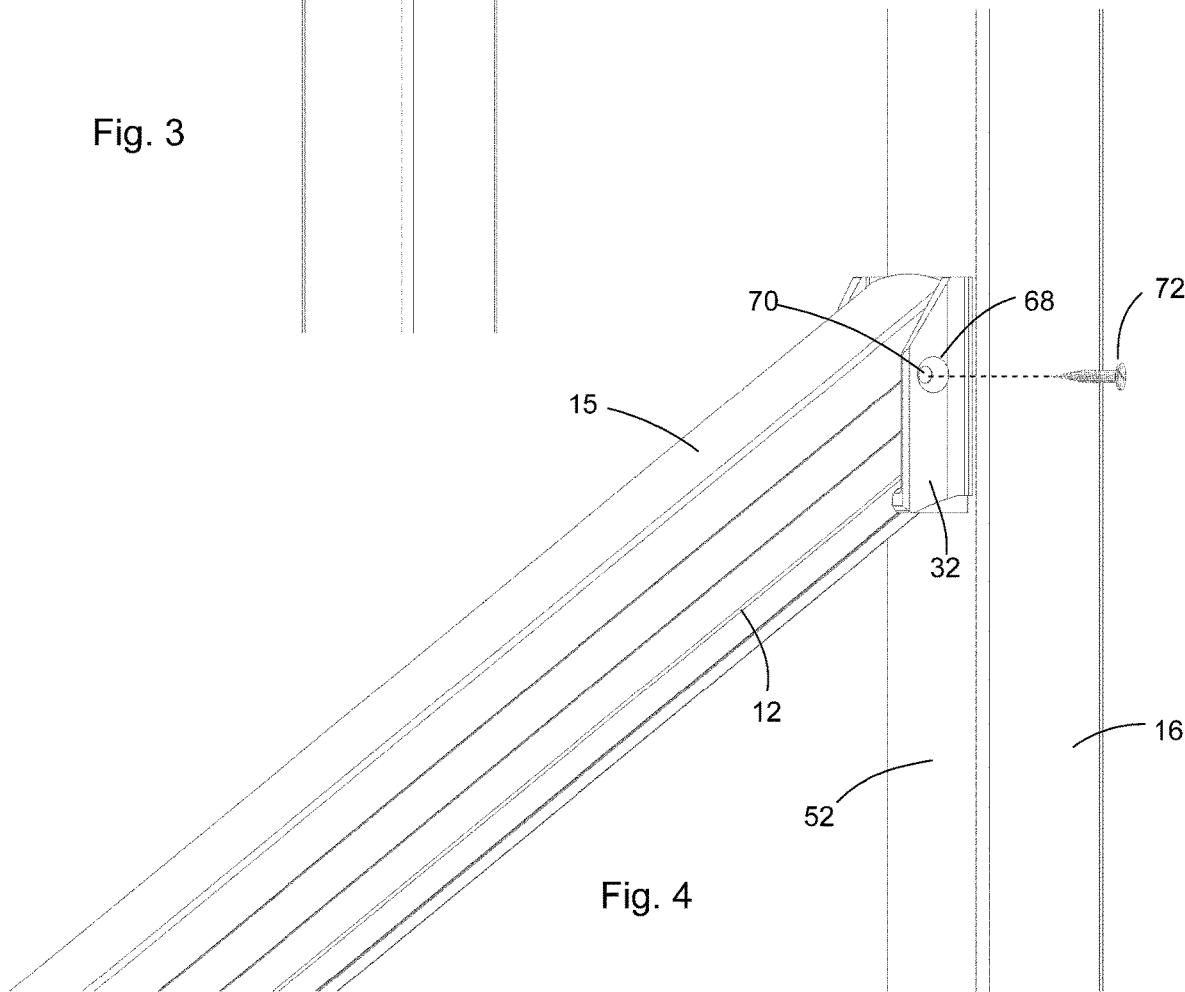
FIG. 4 is a partial view of FIG. 2 showing the first base, the first post, and the upper rail.
Figures 5, 6:
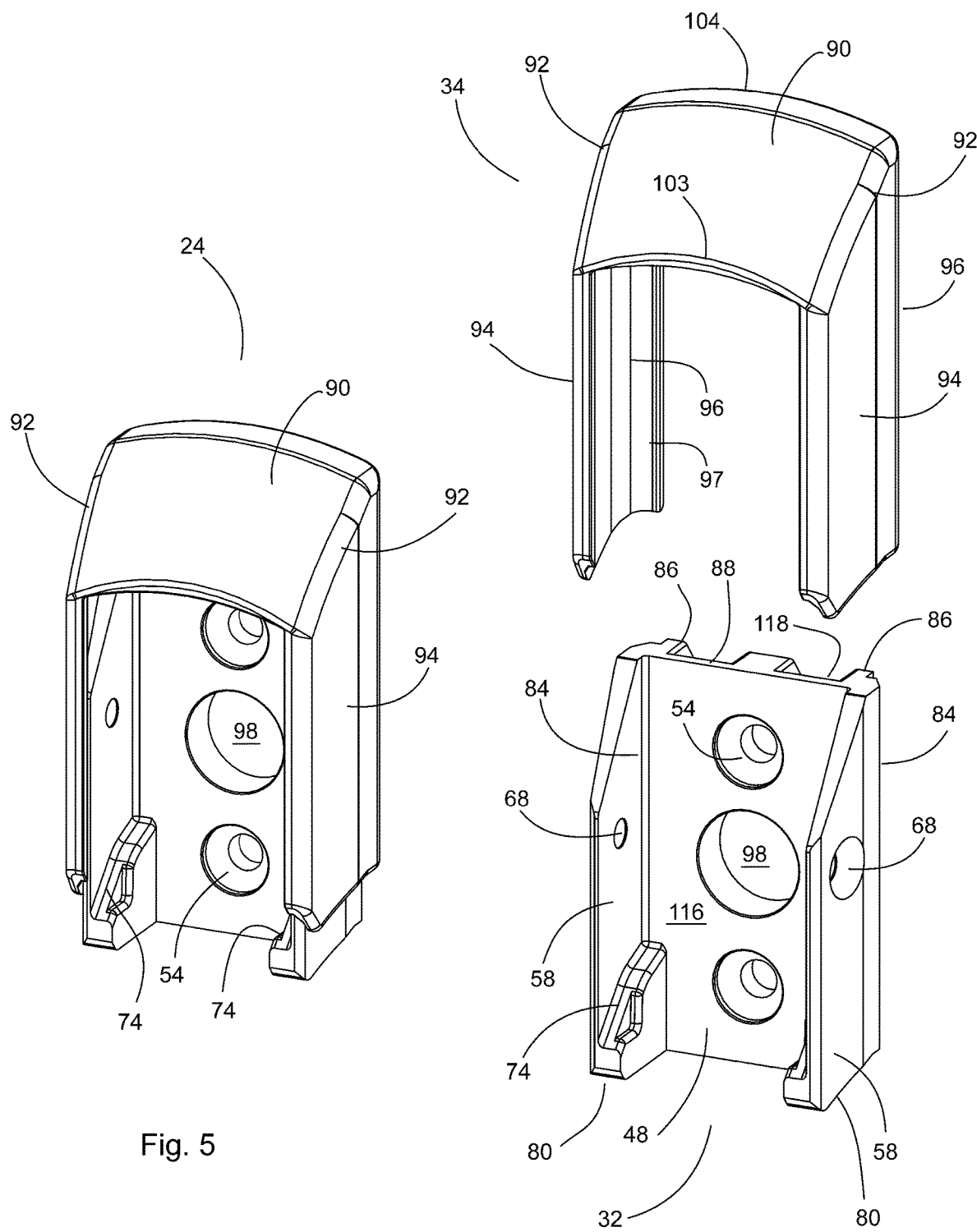
FIG. 5 shows the first bracket of FIG. 2.
FIG. 6 is an exploded view of the first bracket of FIG. 5.

For example, referring to FIG. 4, the sidewalls 58 on the first base 32 are configured to engage and receive the upper rail first end 60 of the upper rail 12. The sidewalls 58 on the second base 36 are configured to engage and receive with lower rail first end 64. The sidewalls 58 on the third base 40 are configured to engage and receive with upper rail second end 62, and the sidewalls 58 on the fourth base 44 are configured to engage and receive with lower rail second end 66.

Preferably, the opposed sidewalls 58 for the first base 32 are spaced such that they are approximately the same distance apart as or slightly greater than a width of the upper rail first end 60. This allows the upper rail first end 60 to slidably engage within the sidewalls 58 of the first base 32 in a snug manner (as best shown in FIG. 4).

Similarly, the opposed sidewalls 58 for the second base 36 are preferably spaced such that they are approximately the same distance apart as or slightly greater than a width of the lower rail first end 64; the opposed sidewalls 58 for the third base 40 are preferably spaced such that they are approximately the same distance apart as or slightly greater than a width of the upper rail second end 62; and the opposed sidewalls 58 for the fourth base 44 are preferably spaced such that they are approximately the same distance apart as or slightly greater than a width of the lower rail second end 66. This allows the lower rail first end 64, the upper rail second end 62, and the lower rail second end 66 to slidably engage within the sidewalls 58 of the second base 36, the third base 40, and the fourth base 44, respectively, in a snug manner Preferably, at least one of the sidewalls 58 on each of the first, second, third, and fourth bases 32, 36, 40, 44 comprises at least one sidewall opening 68. Corresponding rail openings 70 are preferably located on the upper and lower rails 12, 14 proximate to their respective first and second ends 60, 62, 64, 66. The sidewall openings 68 and the corresponding rail openings 70 are adapted to receive rail fasteners 72 that act to secure the first, second, third, and fourth bases 32, 36, 40, 44 to the corresponding upper or lower rails 12, 14. The rail fasteners 72 may be screws, bolts, or any other suitable fasteners. In another embodiment, the rail openings 70 are not present on the upper and lower rails 12, 14. Instead, the rail fasteners 72 simply press against the sides of the upper and lower rails 12, 14 to hold the upper and lower rails 12, 14 in place. FIG. 4 depicts the securing the upper rail 12 to the first post 16 using the first base 32; however, it is understood that the securing of the upper rial 12 or the lower rail 14 using the second, third, and fourth bases 36, 40, 44 are similar.

Referring to FIGS. 5, 6, 11, and 12, the first base 32 and the third base 40 preferably further comprises ledges 74 that extend inwardly from the sidewalls 58. The ledges 74 are preferably angled (i.e. the ledges 74 preferably do not extend horizontally but instead extend at an angle to the horizontal). In particular, the ledges 74 on the first base 32 and the third base 40 are preferably angled in generally opposite directions. The ledges 74 are adapted to support the upper rail first end 60 and the upper rail second end 62 when the first base 32 engages the upper rail first end 60 and when the third base 40 engages the upper rail second end 62. As a result, the ledges 74 on the first base 32 and the third base 40 are angled in directions that generally follows the orientation of the upper rail 12.

Referring to FIGS. 8 and 9, the second base 36 preferably further comprises a floor 76 extending between the opposed sidewalls 58 proximate to the lower sidewall edge 80. The floor 76 is preferably curved or extends at an angle (i.e. at an angle to the horizontal). The floor 76 is adapted to support the lower rail first end 64 when the second base 36 engages the lower rail first end 64. Referring to FIG. 9, because of the general orientation of the lower rail 14, the floor 76 preferably extends at a generally downward angle from the first plate surface 116.

Referring to FIGS. 14 and 15, the fourth base 44 preferably further comprises a bar 78 extending between the opposed sidewalls 58. The bar 78 is adapted to support the lower rail 14 proximate to the lower rail second end 66 when the fourth base 44 engages the lower rail second end 66. Preferably, the bar 78 is spaced apart from the first plate surface 116 and extends proximate to the lower sidewall edge 80.

The plate 48 comprises plate lateral edges 84 that extend along the sides of the plate 48 and a plate upper edge 88. Preferably, the sidewalls 58 extend from the first plate surface 116 proximate to the plate lateral edges 84. Plate protrusions 86 extend substantially vertically from the second plate surface 118, preferably proximate to the plate lateral edges 84 (best shown in FIG. 20).

The plate protrusions 86 extend for at least a portion of the height of the plate 48 and preferably extend for an entire height of the plate 48. If the plate protrusions 86 extend for only a portion of the height of the plate 48, the plate protrusions 86 preferably extend from the plate upper edge 88. The plate protrusions 86 on the first, second, third, and fourth base 32, 36, 40, 44 are adapted to receive the corresponding first, second, third, and fourth covers 34, 38, 42, 46, respectively.

One or more of the first, second, third, and fourth bases 32, 36, 40, 44 may comprise one or more accessory opening 98. For example, in one embodiment, the first and third bases, 32, 40 each comprise one or more accessory openings 98. The accessory openings 98 are preferably formed on the plate 48 and extends through the plate 48. Preferably, the accessory openings 98 corresponds to post accessory openings 100 located on the post surfaces 52 when the first, second, third, and fourth bases 32, 36, 40, 44 are attached to the first and second posts 16, 18. The accessory openings 98 are adapted to allow for accessories (such as lighting strips) to be threaded therethrough (thereby allowing accessories to extend between the interior of the upper or lower rails 12, 14 and the interior of the first and second posts 16, 18.

Referring to FIGS. 2 to 15, each of the first, second, third, and fourth covers 34, 38, 42, 46 comprises a roof 90 with roof lateral edges 92. Opposed cover walls 94 extend generally from the roof lateral edges 92, preferably in a substantially perpendicular direction. Each of the cover walls 94 comprises a cover wall edge 96. Flanges 97 may extend inwardly from or proximate to the cover wall edge 96. The flanges 97 extend from at least a portion of the height of the cover wall edge 96 and are adapted to engage with the plate protrusions 86 by abutting against them.

For example, in the embodiment shown in FIGS. 2 to 15, the flanges 97 extend from the cover wall edge 96 for substantially the entire height of the cover wall edge 96. The flanges 97 preferably engages and abuts with the plate protrusions 86 when placed over the plate 48.

Figure 20:
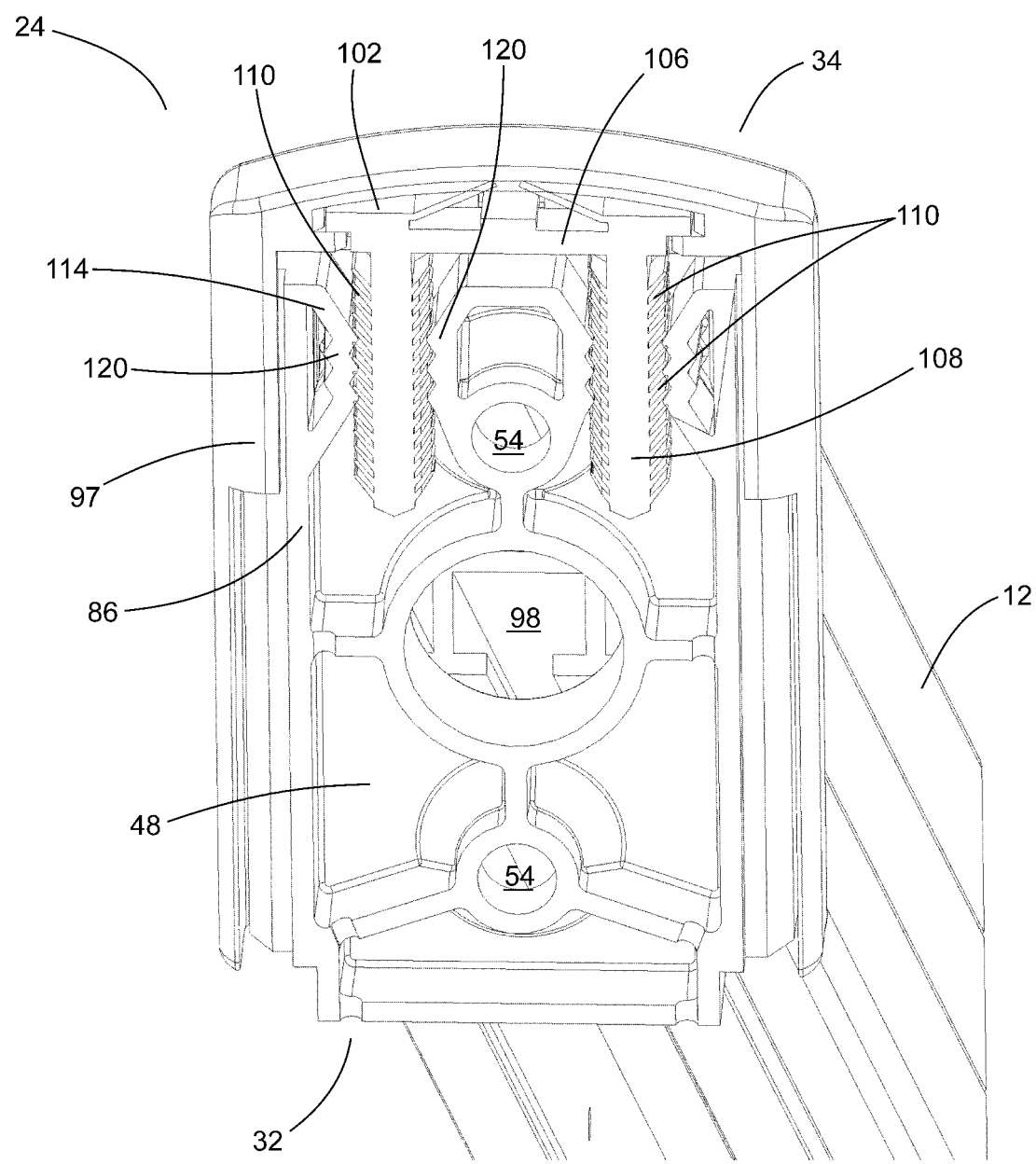
FIG. 20 is a partial view showing the first bracket in accordance with another embodiment.

However, it is also possible that the flanges 97 extend for only a portion of a height of the cover wall edge 96 (for example, in the embodiment shown in FIG. 20).

When the first, second, third, and fourth covers 34, 38, 42, 46 are placed over the first, second, third, and fourth bases 32, 36, 40, 44, respectively, the flanges 97 engage the plate protrusions 86, thus assisting in securing the first, second, third, and fourth covers 34, 38, 42, 46 to the first, second, third, and fourth bases 32, 36, 40, 44, respectively.

Referring to FIGS. 16 to 19, in another embodiment, one or more of the first, second, third, and fourth covers 34, 38, 42, 46 comprises an attachment portion 102 that extends generally downwardly from the roof 90. Preferably, the roof 90 comprises roof front and rear edges 103, 104, with the attachment portion 102 extending proximate to the roof rear edge 104. The attachment portion 102 may be removably or fixedly attached to the roof 90.

Figures 23, 24:
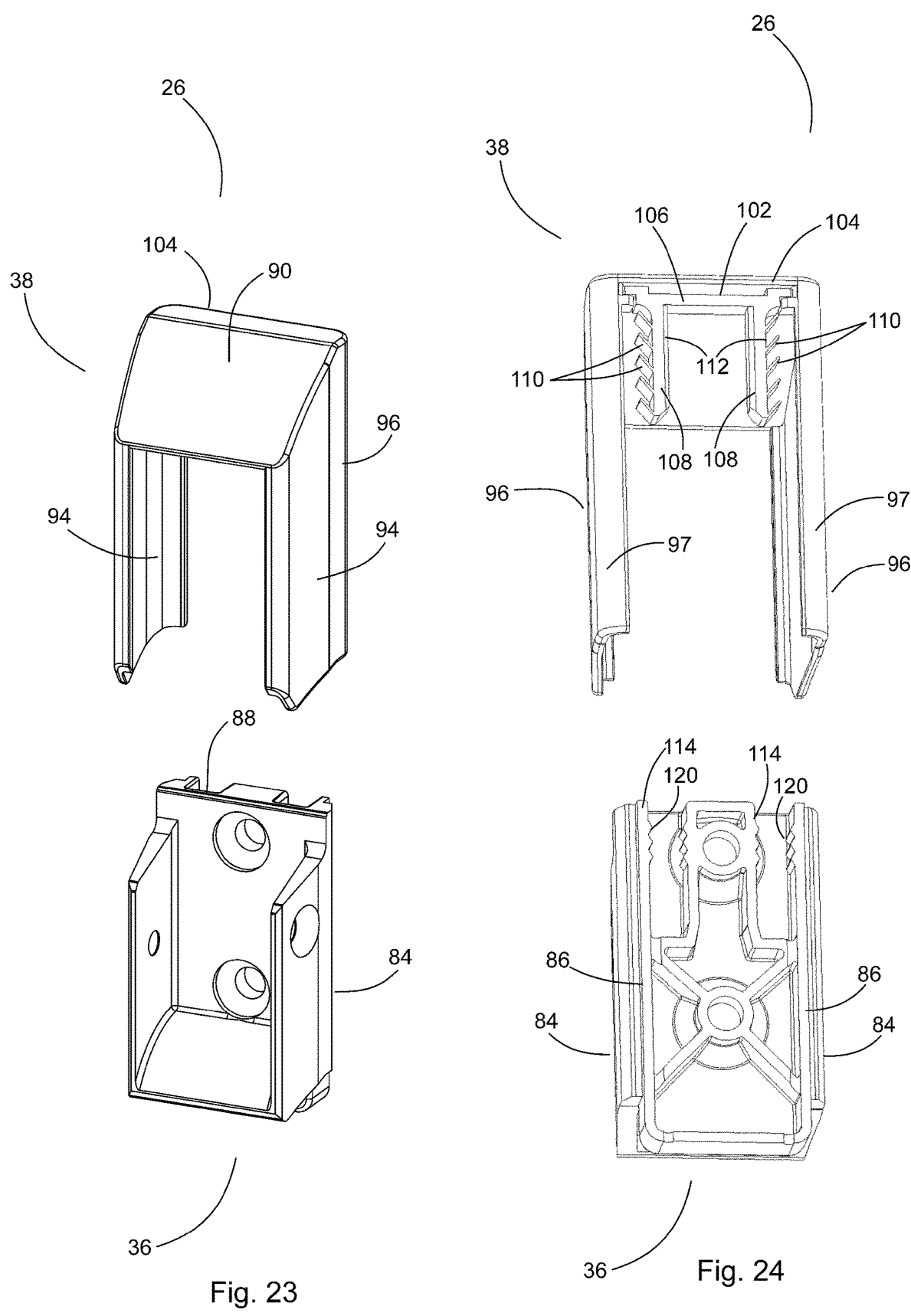
FIG. 23 is a front exploded view of the second bracket of FIG. 17.
FIG. 24 is a rear exploded view of the second bracket of FIG. 17.
Figures 25, 26:
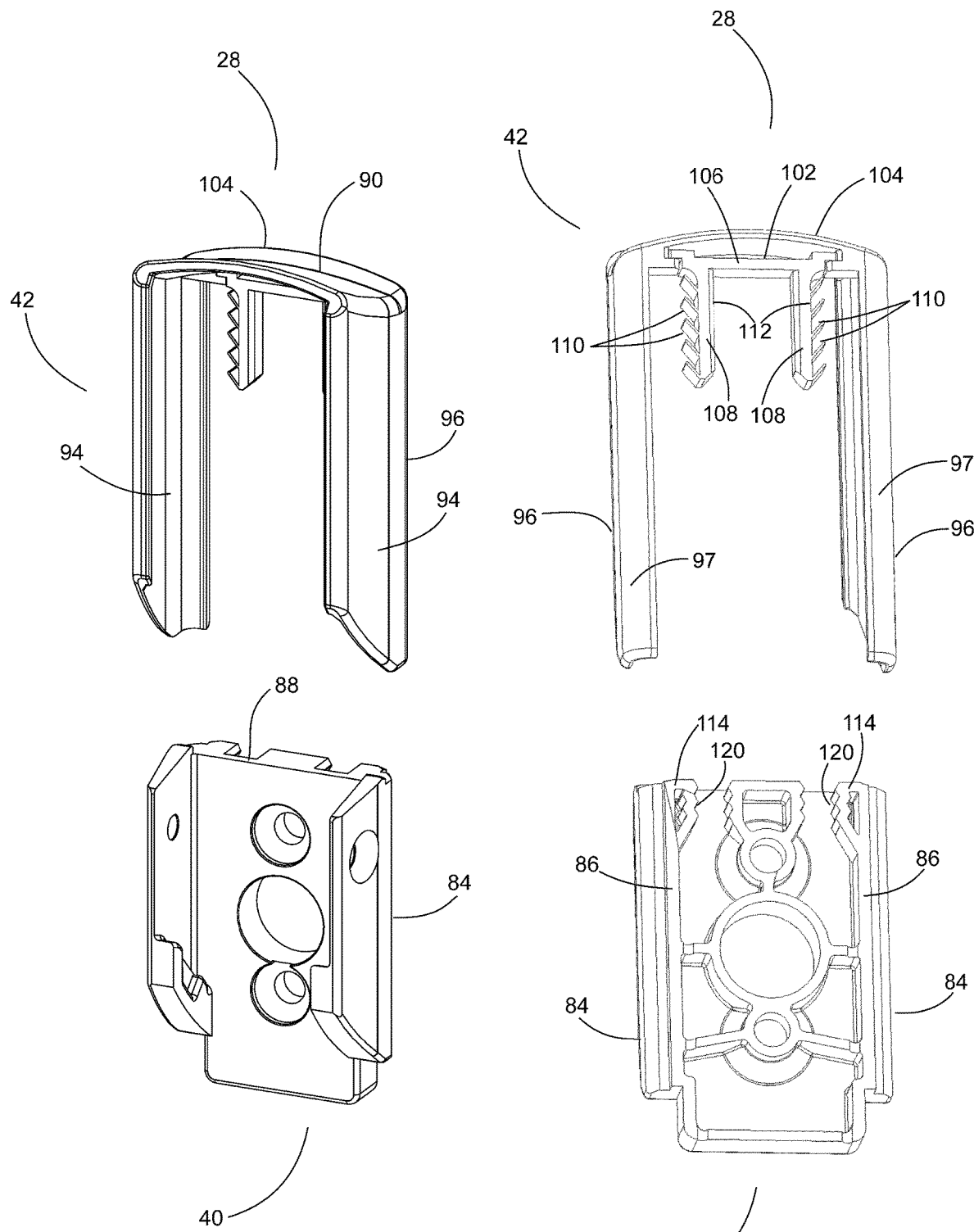
FIG. 25 is a front exploded view of the third bracket of FIG. 18.
FIG. 26 is a rear exploded view of the third bracket of FIG. 18.

FIGS. 21 and 22 show this alternate embodiment for the first bracket 24. FIGS. 23 and 24 show this alternate embodiment for the second bracket 26. FIGS. 25 and 26 show this alternate embodiment for the third bracket 28. FIGS. 27 and 28 show this alternate embodiment for the fourth bracket 30.

The attachment portion 102 comprises a body portion 106 that may extend substantially horizontally and one or more arms 108 extending from the body portion 106. The body portion 106 is preferably attached to the roof 90. Referring to FIGS. 21 to 28, in the embodiments shown, two arms 108 extend from the body portion 106, with each arm 106 comprising lateral arm surfaces 112. A plurality of angled projections 110 may extend from one or both of the lateral arm surfaces 112. The projections 110 preferably are angled upwards, with their structures being able to be deflected or deformed. For example, in the embodiment shown in FIG. 22, the projections 110 extend from one of the lateral arm surfaces 112 for each of the arms 106.

FIG. 20 shows an embodiment of the first cover 34 secured to the first base 32. It is understood that the second, third, and fourth covers 38, 42, 46 may be secured the second, third, and fourth bases 36, 40, 44 in a similar manner. In the embodiment shown in FIG. 20, the projections 110 extend from both of the lateral arm surfaces 112. The projections 110 are adapted to engage with receiving members 114 located on the plate 48. The receiving members 114 preferably are formed on the second plate surface 118 and comprise a plurality of teeth 120 that are adapted to engage with the projections 110. Four receiving members 114 may be present on the second plate surface 118, with each of the receiving members 114 located to engage with one of the lateral arm surfaces 112 when the attachment portion 102 is inserted from above into the receiving members 114. The receiving members 114 generally extend vertically proximate to the plate upper edge 88 for at least a portion of the height of the plate 48.

During engagement, the projections 110 are slightly deflected (and pushed upwards) when the arms 108 move downwardly against the teeth 120. After one of the projections 110 have moved past one of the teeth 120, the projection 100 returns to its original shape and orientation and is now trapped between two of the teeth 120. Because of the angularity of the projections 110, once the arms 108 have moved past the receiving members 114, it is very difficult to remove the attachment portion 102 from the receiving members 114.

The use of the attachment portion 102 and the receiving members 114 allow the first, second, third, and fourth covers 34, 38, 42, 46 to be securely attached to the first, second, third, and fourth bases 32, 36, 40, 44, respectively, without the need for additional fasteners. In the embodiment shown in FIG. 20, at least some of the receiving members 114 may be attached to or integral with the plate protrusions 86.

The roof 90 for the first cover 34 and the second cover 38 are generally angled downwardly, to take into account the orientation of the upper and lower rails, 12, 14. The roof 90 for the third cover 42 and the fourth cover 46 are relatively flatter, but are angled generally upwardly. The roofs 90 act to cover any visual gaps between the first post 16 and the upper and lower rail first ends 60, 64 and between the second post 18 and the upper and lower rail second ends 62, 66. The roofs 90 also act to prevent water and other materials from entering into those gaps.

The first, second, third, and fourth brackets 24, 26, 28, 30 allow the upper and lower rails 12, 14 to be connected to the first and second posts 16, 18 at a range of angles and still prevent any noticeable visual gaps between the upper and lower rails 12, 14 and the first and second posts 16, 18. For example, the angles of the upper and lower rails 12, 14 with respect to the first and second posts 16, 18 may be between approximately 19° and 44° without any gaps visible.

In another embodiment, the location of the sidewall openings 68 may be moved to other locations on the first, second, third, and fourth bases 32, 36, 40, 44. For example, in another embodiment, the sidewall openings 68 may be located such that the rail fasteners 72 are screwed into the top of the upper and lower rails 12, 14.

Installation of the first, second, third, and fourth brackets 24, 26, 28, 30 will now be described. Referring to FIGS. 1, 3, and 4, the first and second posts 16, 18 are first secured to the ground at the appropriate locations relative to the stairs 20. The first and second bases 32, 36 are then secured to the first post 16 by aligning the plate openings 54 on the first and second bases 32, 36 with the corresponding post openings 50 on the first post 16 and using the post fasteners 56 to secure the first and second bases 32, 36 to the first post 16.

The third and fourth bases 40, 44 are then secured to the second post 18 by aligning the plate openings 54 on the third and fourth bases 40, 44 with the corresponding post openings 50 on the second post 18 and using the post fasteners 56 to secure the third and fourth bases 40, 44 to the second post 18.

The lower rail 14 can then be placed in the second and fourth bases 36, 44. This can be done by inserting the lower rail first end 64 between the sidewalls 58 of the second base 36. The lower rail first end 64 may be allowed to rest on the floor 76. The lower rail second end 66 may be inserted between the sidewalls 58 of the fourth base 44. The lower rail second end 66 may be allowed to rest on the bar 78. The lower rail 14 can then be secured in place to the second and fourth bases 36, 44 by inserting the rail fasteners 72 through the sidewall openings 68 on the second and fourth bases 36, 44 so that the rail fasteners 72 press against the sides of the lower rail 14.

The second and fourth covers 38, 46 can then be inserted over the second and fourth bases 36, 44, respectively. The second cover 38 is placed above the second base 36 such that the ends of the arms 108 are above the receiving members 114. As the second cover 38 is pushed downward on the second base 36, the projections 110 on the arms 108 engage with the teeth 120 on the receiving members 114. The angularity of the projections 110 assist in ensuring that the second cover 38 cannot easily be pulled upwards once the projections 110 have engaged the teeth 120. The second cover 38 is pushed downward until the roof front edge 103 comes into contact with the rail upper surface 15 of the lower rail 14 proximate to the lower rail first end 64. The roof 90 of the second cover 38 preferably defines a transition between the post surface 52 and the rail upper surface 15.

The fourth cover 46 is placed above the fourth base 44 such that the ends of the arms 108 are above the receiving members 114. As the fourth cover 46 is pushed downward on the fourth base 44, the projections 110 on the arms 108 engage with the teeth 120 on the receiving members 114. The angularity of the projections 110 assist in ensuring that the fourth cover 46 cannot easily be pulled upwards once the projections 110 have engaged the teeth 120. The fourth cover 46 is pushed downward until the roof front edge 103 comes into contact with the rail upper surface 15 of the lower rail 14 proximate to the lower rail second end 66. The roof 90 of the fourth cover 46 preferably defines a transition between the post 52 and the rail upper surface 15.

Depending on the angle of the lower rail 14, the portion of the arms 108 of the second and fourth covers 38, 46 that engage with the receiving members 114 of the second and fourth bases 36, 44 may vary. For example, if the lower rail 14 is relatively flat (i.e. the lower rail 14 is oriented at a relatively small angle with respect to the horizontal), then the second and fourth covers 38, 46 may be pushed further down before the roof front edge 103 comes into contact with the rail upper surface 15. In this scenario, a greater portion of the arms 108 may engage with the receiving members 114. Alternatively, if the lower rail 14 is relatively steep (i.e. the lower rail 14 is oriented at a relatively large angle with respect to the horizontal), then the second and fourth covers 38, 46 may not be pushed down as much before the roof front edge 103 comes into contact with the rail upper surface 15. In this scenario, a smaller portion of the arms 108 may engage with the receiving members 114.

After the lower rail 14 has been installed, the upper rail 12 can then be placed in the first and third bases 32, 40. This can be done by inserting the upper rail first end 60 between the sidewalls 58 of the first base 32. The upper rail first end 60 may be allowed to rest on the ledges 74 on the first base 32. The upper rail second end 62 may be inserted between the sidewalls 58 of the third base 40. The upper rail second end 62 may be allowed to rest on the ledges 74 on the third base 40. The upper rail 12 can then be secured in place to the first and third bases 32, 40 by inserting the rail fasteners 72 through the sidewall openings 68 on the first and third bases 32, 40 so that the rail fasteners 72 press against the sides of the upper rail 12.

The first and third covers 34, 42 can then be inserted over the first and third bases 32, 40, respectively. The first cover 34 is placed above the first base 32 such that the ends of the arms 108 are above the receiving members 114. As the first cover 34 is pushed downward on the first base 32, the projections 110 on the arms 108 engage with the teeth 120 on the receiving members 114. The angularity of the projections 110 assist in ensuring that the first cover 34 cannot easily be pulled upwards once the projections 110 have engaged the teeth 120. The first cover 34 is pushed downward until the roof front edge 103 comes into contact with the rail upper surface 15 of the upper rail 12 proximate to the upper rail first end 60. The roof 90 of the first cover 34 preferably defines a transition between the post surface 52 and the rail upper surface 15.

The third cover 42 is placed above the third base 40 such that the ends of the arms 108 are above the receiving members 114. As the third cover 42 is pushed downward on the third base 40, the projections 110 on the arms 108 engage with the teeth 120 on the receiving members 114. The angularity of the projections 110 assist in ensuring that the third cover 42 cannot easily be pulled upwards once the projections 110 have engaged the teeth 120. The third cover 42 is pushed downward until the roof front edge 103 comes into contact with the rail upper surface 15 of the upper rail 12 proximate to the upper rail second end 62. The roof 90 of the third cover 42 preferably defines a transition between the post 52 and the rail upper surface 15.

Depending on the angle of the upper rail 12, the portion of the arms 108 of the first and third covers 34, 42 that engage with the receiving members 114 of the first and third bases 32, 40 may vary. For example, if the upper rail 12 is relatively flat (i.e. the upper rail 12 is oriented at a relatively small angle with respect to the horizontal), then the first and third covers 34, 42 may be pushed further down before the roof front edge 103 comes into contact with the rail upper surface 15. In this scenario, a greater portion of the arms 108 may engage with the receiving members 114. Alternatively, if the upper rail 12 is relatively steep (i.e. the upper rail 12 is oriented at a relatively large angle with respect to the horizontal), then the first and third covers 34, 42 may not be pushed down as much before the roof front edge 103 comes into contact with the rail upper surface 15. In this scenario, a smaller portion of the arms 108 may engage with the receiving members 114.

It will be appreciated by those skilled in the art that the preferred embodiment has been described in some detail but that certain modifications may be practiced without departing from the principles of the invention.

The invention claimed is:

1. A bracket for connecting a stair rail to a post, the bracket comprising:
a base comprising:
a plate with first and second surfaces, the plate comprising at least one plate opening extending therethrough and adapted to receive post fasteners for securing the plate to the post;
two opposed sidewalls extending from the first surface of the plate and adapted to receive the stair rail, each of the sidewalls comprising at least one sidewall opening adapted to receive sidewall fasteners for securing the sidewall to the stair rail;
two plate protrusions are formed on the second surface of the plate, the two plate protrusions extending vertically for at least a portion of a height of the plate; and
one or more receiving members wherein at least one of the one or more receiving members extend from at least one of the two plate protrusions; and
a cover adapted to slide over the base, the cover comprising:
a roof;
two opposed cover walls extending from the roof and adapted to slide over the sidewalls, wherein each of the cover walls comprise a cover wall edge extending along a height of the cover wall;
two flanges, wherein each of the flanges extend inwardly from the cover wall edge for at least a portion of the height of the cover wall, wherein the flanges are adapted to abut against the plate protrusions when the cover is slid over the base; and
an attachment portion comprising:
a body portion attached to the roof;
two arms extending vertically from the body portion, the two arms extending between, and spaced apart from, the cover walls, wherein each of the arms comprises two lateral arm surfaces; and
for each of the arms, a plurality of projections extending from one or both of the lateral arm surfaces;
wherein the one or more receiving members are adapted to secure the cover to the base by engaging with one or more of the plurality of projections at one of a plurality of possible locations along a height of the two arms.

2. The bracket of claim 1, wherein the plurality of projections extend from both of the lateral arm surfaces.

3. The bracket of claim 1, wherein the projections are angled.

4. The bracket of claim 3, wherein the projections are deflectable.

5. The bracket of claim 4, wherein the one or more receiving members comprise a plurality of teeth, the teeth adapted to engage with the plurality of projections.

6. The bracket of claim 1, wherein the plate comprises one or more accessory openings extending therethrough, the accessory openings adapted to allow an accessory to pass through the plate.

7. The bracket of claim 1, wherein at least one of the one or more receiving members is integral with the plate protrusions.

8. The bracket of claim 1, wherein the roof is contoured to cover a gap between the stair rail and the post.

9. A railing system for stairs, the system comprising:
an upper rail comprising upper rail first and second ends;
a lower rail comprising lower rail first and second ends;
first and second posts, wherein the first post is elevated with respect to the second post;

a first bracket for connecting the upper rail first end to the first post;
a second bracket for connecting the lower rail first end to the first post;
a third bracket for connecting the upper rail second end to the second post; and
a fourth bracket for connecting the lower rail second end to the second post;
wherein each of the first, second, third, and fourth brackets comprise:
a base comprising:
a plate with first and second surfaces, the plate comprising at least one plate opening extending therethrough and adapted to receive post fasteners for securing the plate to the post;
two opposed sidewalls extending from the first surface of the plate and adapted to receive one of the upper rail or the lower rail, each of the sidewalls comprising at least one sidewall opening adapted to receive sidewall fasteners for securing the sidewall to the stair rail;
two plate protrusions formed on the second surface of the plate, the two plate protrusions extending vertically for at least a portion of a height of the plate; and
one or more receiving members wherein at least one of the one or more receiving members extend from at least one of the two plate protrusions; and
a cover adapted to slide over the base, the cover comprising:
a roof;
two opposed cover walls extending from the roof and adapted to slide over the sidewalls, wherein each of the cover walls comprise a cover wall edge extending along a height of the cover wall;
two flanges, wherein each of the flanges extend inwardly from the cover wall edge for at least a portion of the height of the cover wall, wherein the flanges are adapted to abut against the plate protrusions when the cover is slid over the base; and
an attachment portion comprising:
a body portion attached to the roof;
two arms extending vertically from the body portion, the
two arms extending between, and spaced apart from,
the cover walls, wherein each of the arms comprises
two lateral arm surfaces; and
for each of the arms, a plurality of projections extending from one or both of the lateral arm surfaces;
wherein the one or more receiving members are adapted to secure the cover to the base by engaging with one or more of the plurality of projections at one of a plurality of possible locations along a height of the two arms.

10. The railing system of claim 9, wherein for the first and third brackets, the base comprises ledges extending inwardly from the sidewalls, the ledges adapted to support the upper rail.

11. The railing system of claim 10, wherein the ledges are angled with respect to the horizontal.

12. The railing system of claim 11 wherein the ledges for the first bracket are angled in a direction opposite to the ledges for the third bracket.

13. The railing system of claim 9, wherein for the second bracket, the base comprises a floor adapted to support the lower rail.

14. The railing system of claim 9, wherein for the fourth bracket, the base comprises a bar adapted to support the lower rail.

15. The railing system of claim 9, wherein the roof is contoured to cover a gap between the stair rail and the post.

16. The railing system of claim 15, wherein the roof is contoured to prevent water from entering the gap.

17. The railing system of claim 9, wherein at least for one or more of the first, second, third, or fourth brackets, the plate comprises one or more accessory openings extending therethrough, the accessory openings adapted to allow an accessory to pass through the plate.

18. A bracket for connecting a stair rail to a post, the bracket comprising:
a base comprising:
a plate with first and second surfaces, the plate comprising at least one plate opening extending therethrough and adapted to receive post fasteners for securing the plate to the post;
two opposed sidewalls extending from the first surface of the plate and adapted to receive the stair rail, each of the sidewalls comprising at least one sidewall opening adapted to receive sidewall fasteners for securing the sidewall to the stair rail;
two plate protrusions formed on the second surface of the plate, the two plate protrusions extending vertically for at least a portion of a height of the plate; and
one or more receiving members, wherein at least one of the one or more receiving members extend from the second surface of the plate; and
a cover adapted to slide over the base, the cover comprising:
a roof;
two opposed cover walls extending from the roof and adapted to slide over the sidewalls, wherein each of the cover walls comprise a cover wall edge extending along a height of the cover wall;
two flanges, wherein each of the flanges extend inwardly from the cover wall edge for at least a portion of the height of the cover wall, wherein the flanges are adapted to abut against the plate protrusions when the cover is slid over the base; and
an attachment portion comprising:
a body portion attached to the roof;
two arms extending vertically from the body portion, the two arms extending between, and spaced apart from, the cover walls, wherein each of the arms comprises two lateral arm surfaces; and
for each of the arms, a plurality of projections extending from one or both of the lateral arm surfaces;
wherein the one or more receiving members are adapted to secure the cover to the base by engaging with one or more of the plurality of projections at one of a plurality of possible locations along a height of the two arms.

* * * * *